United States Patent [19]

Thomson

[11] Patent Number: 4,829,890

[45] Date of Patent: May 16, 1989

[54] COUNTERFLOW WASHER AND COOLER APPARATUS

[75] Inventor: Meredith C. Thomson, Sheboygan, Wis.

[73] Assignee: Kusel Equipment Company, Watertown, Wis.

[21] Appl. No.: 169,957

[22] Filed: Mar. 18, 1988

[51] Int. Cl.$^4$ .................. A01J 25/11; A23C 19/00
[52] U.S. Cl. ........................... 99/455; 99/456; 99/466; 99/536; 366/313; 366/325
[58] Field of Search .......... 99/452, 455, 456, 460–463, 99/464, 466, 536; 366/293, 325, 329, 309, 311, 312, 313; 134/60, 66; 426/478, 506, 491

[56] References Cited

U.S. PATENT DOCUMENTS

| | | | |
|---|---|---|---|
| 1,497,454 | 6/1924 | Light | 366/309 |
| 2,366,615 | 1/1945 | Hansen | 99/461 X |
| 3,181,840 | 5/1965 | Rietz | 366/329 X |
| 3,895,958 | 7/1975 | Gill et al. | 366/329 X |
| 4,321,861 | 3/1982 | Hain et al. | 99/455 |
| 4,679,497 | 7/1987 | Tomatis | 99/460 X |

*Primary Examiner*—Timothy F. Simone
*Attorney, Agent, or Firm*—James E. Nilles; Donald C. McGaughey

[57] ABSTRACT

A counterflow washer and cooler for processing cottage cheese curd and whey material comprising a horizontal housing, and a material and fluid blender rotatable mounted in the housing. The blender includes a rotatable shaft having at least one material lifting and conveying assembly rigidly mounted thereon having a material supporting surface and a guiding and conveying wall for moving material longitudinally through the housing in counterflow to the direction of flow of a washing and cooling fluid passing through the housing.

The method disclosed is for washing and cooling cottage cheese curds and includes the steps of disposing a housing in a horizontal position, admitting a washing and cooling fluid into and upstream end of the housing and discharging it at a downstream end to establish a reservoir of flowing fluid, placing the material into the reservoir adjacent the dowstream end, lifting the material in the reservoir transversely to the normal direction of fluid flow, lowering the material in the reservoir at an acute angle relative to the normal direction of fluid flow to move the material in an upstream direction, and repeating the lifting and lowering steps until the material is discharged at the upstream end of the housing.

18 Claims, 5 Drawing Sheets

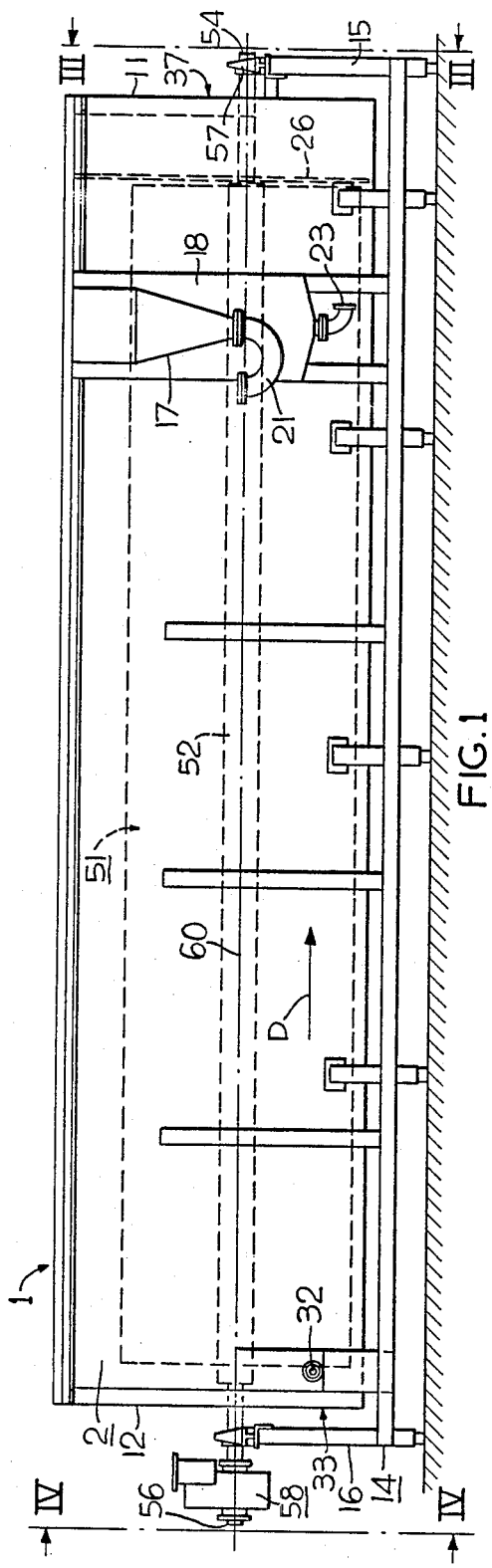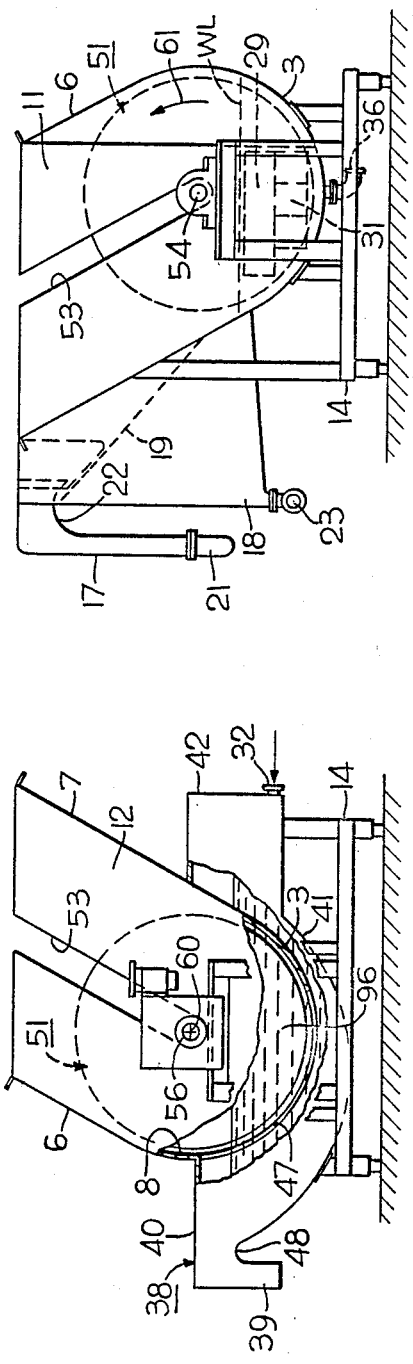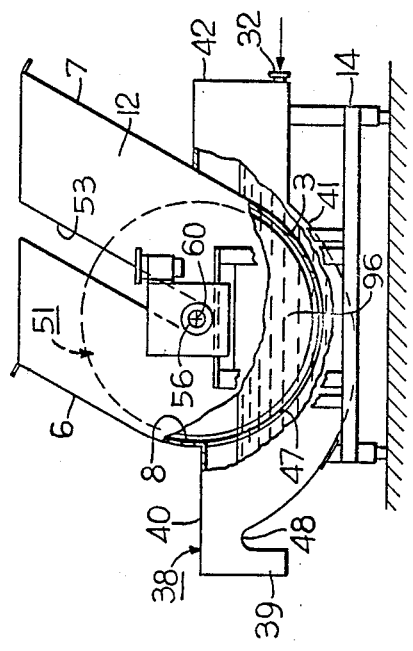

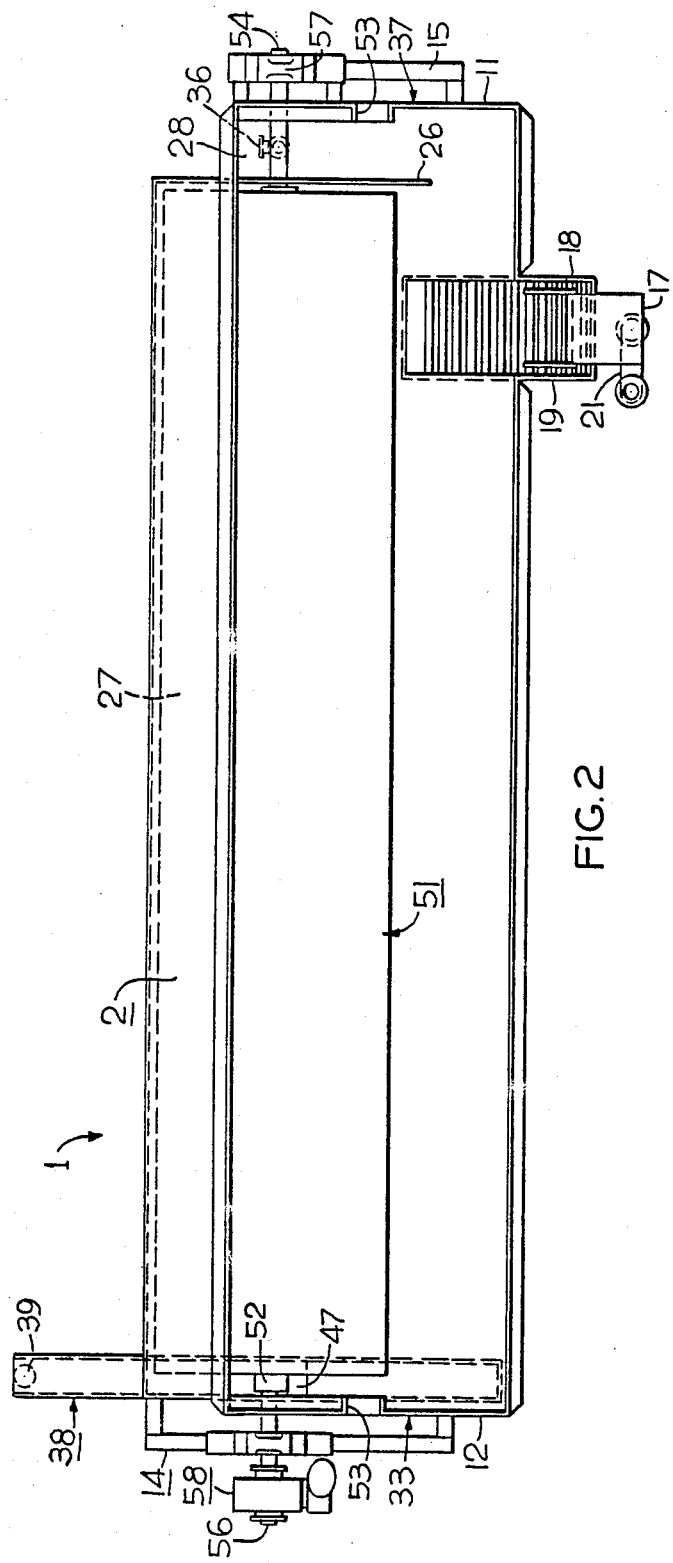
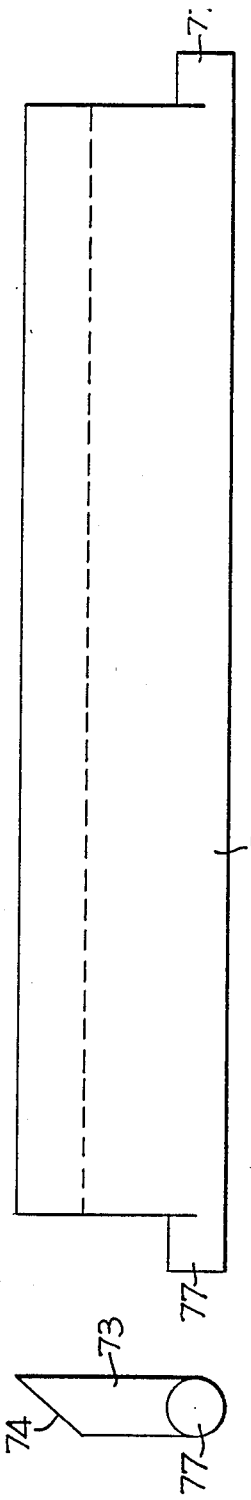
FIG.2
FIG.9
FIG.10

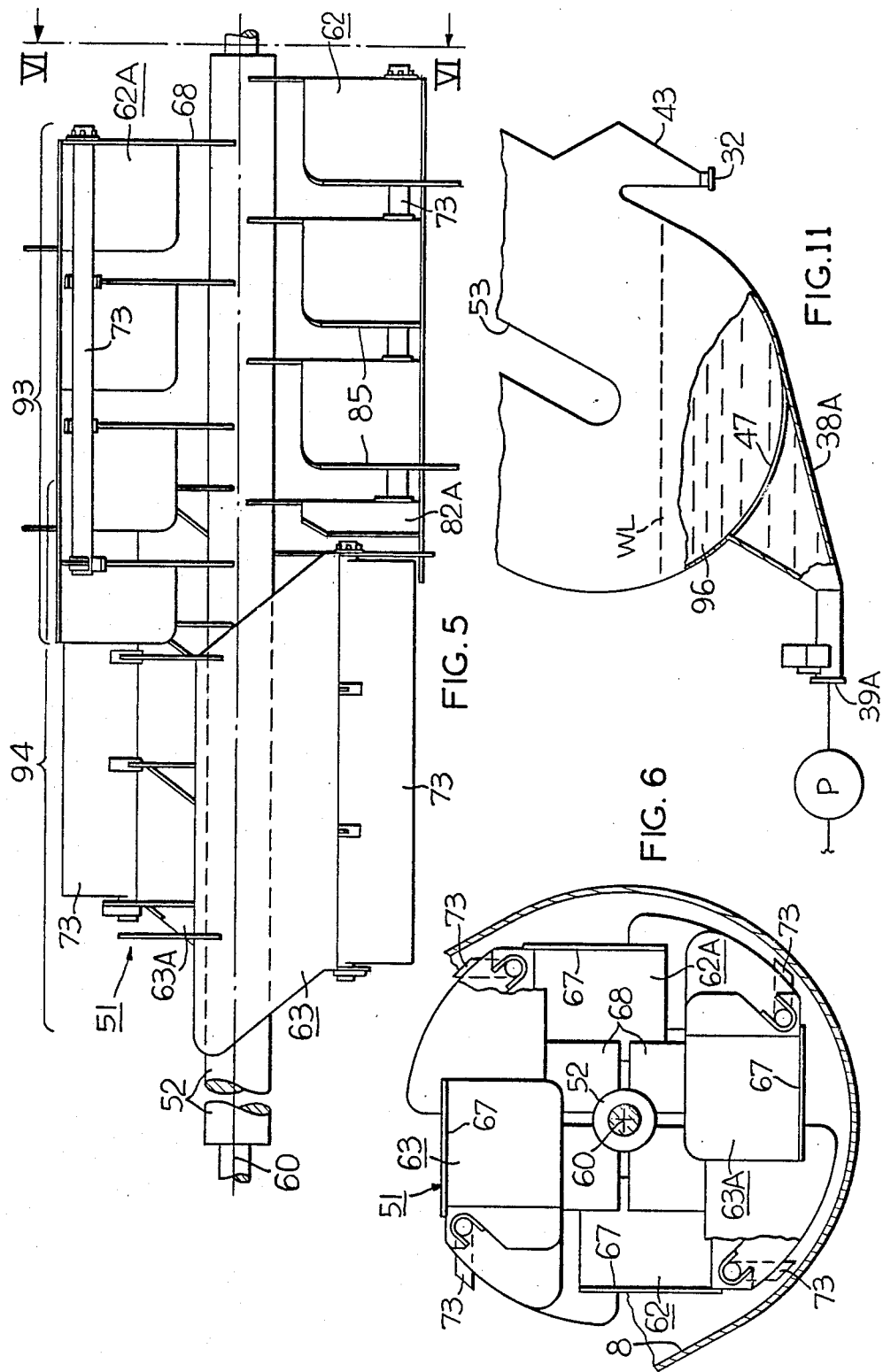

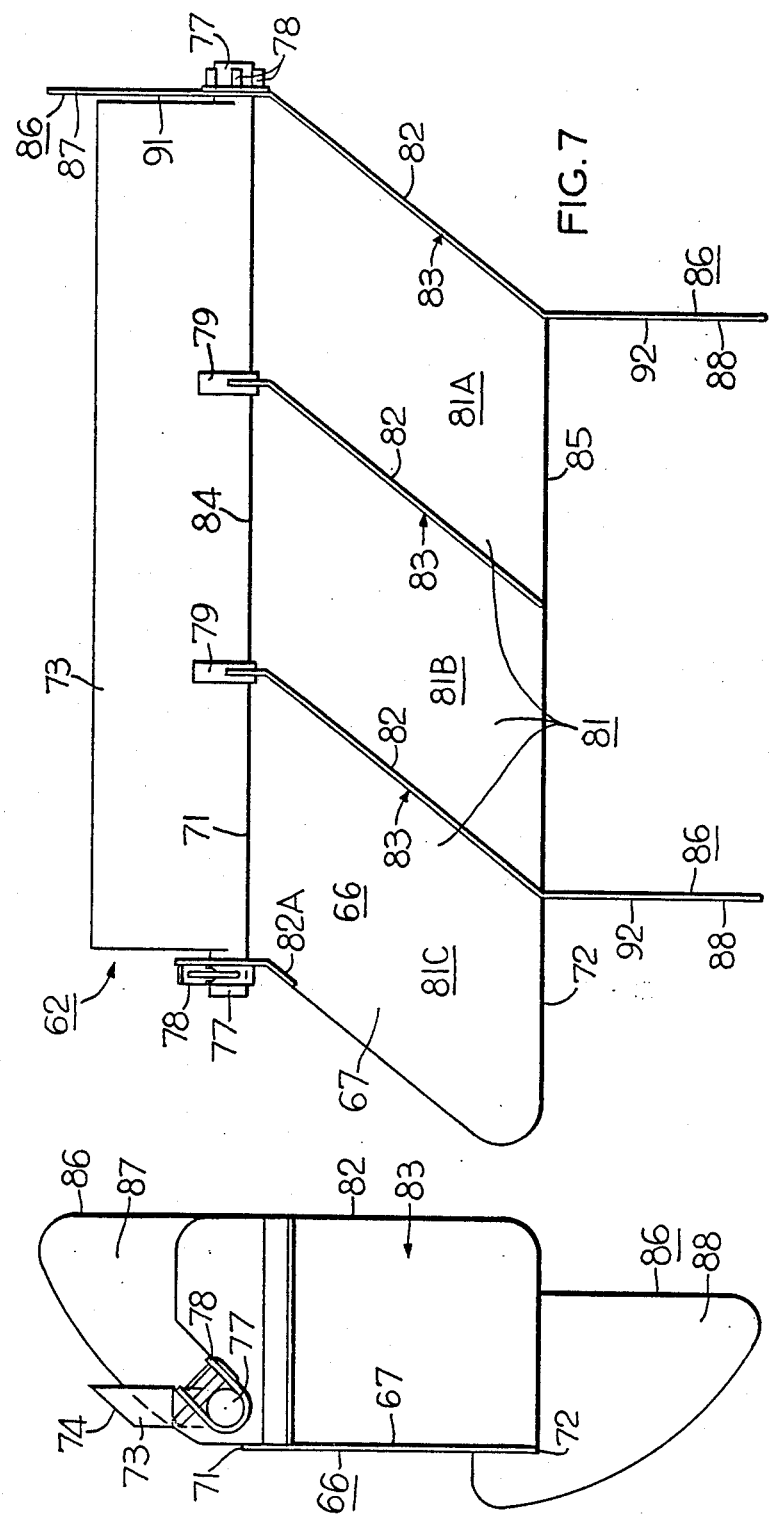

FLUID FLOW INTERRUPTION

MATERIAL LOADING SECTOR

MATERIAL LIFTING SECTOR

MATERIAL LOWERING SECTOR

COUNTERFLOW WASHER AND COOLER APPARATUS

BACKGROUND OF THE INVENTION

Field of the Invention

This invention relates to an apparatus and method for separating curds from whey and more specifically for cooling the curds while washing the whey therefrom during the production of cottage cheese.

In the commercial production of cottage cheese, skim milk usually at a temperature of 90° is placed in a double walled vat typically having a depth of 39 or 40 inches and a capacity of 3500 gallons. One or more acidifiers or a culture is added to 90° skim milk. Rennet may also be added to promote curd coagulation. When the curd has developed, stainless steel wires are run lengthwise, vertically and horizontally and then crosswise through the vat to cut the curd into ¼ inch to ¾ inch cubes. Then the curd is heated to further firm it and expell the whey, which is a waste product. The curd must then be separated from the whey, cooled and washed. In the prior art it is necessary to use a high volume of water to wash and cool the curd and remove the whey which, if not removed, taints the finished cottage cheese with an unpleasant acid taste.

In order to increase efficiency and reduce costs it is necessary to empty the vat as soon as possible after the curds have been cooked to make the vat available for a new batch. The cooked curds are cooled and washed outside of the vat. The cooked curds are, somewhat fragile and as they are cooled they become more fragile. Tee curds are susceptible of degrading into powder-like fines which then suspend in the liquid whey and flow away in the cooling and wash water. Such degrading reduces the amount of cottage cheese produced from a given volume of skim milk. While it is possible to filter out and collect these fines it is not practical to re-introduce them into the cottage cheese as the fines make the finished cottage product pasty and grainy in consistency which consumers do not like. Further, there is no economical way to agglomerate these fines back into the form of curds.

As the curds and whey exit the vat most of the whey is drained off and transfer water is added. To minimize degrading, in one prior art method of washing and cooling, the curds, residual whey and transfer water are pumped into a vertical washer and cooler tower. The curd remains generally stationary in a lower portion of the tower to avoid degrading it and the washing and cooling water flows upward through the stationary curd and out of the top of the tower. While such washer and coolers generally are satisfactory they have certain disadvantages including a slow cycling time and a requirement for a high volume of washing and cooling water. Even with a long period of washing and cooling, the whey may not be completely washed away and the curd sufficiently cooled because of bridging, and channeling which can occur as the cooling and wash water percolates upward through stationary curds in the tower. Such bridging results in hot spots of inadequately washed and cooled curd. An additional disadvantage of prior art apparatus an methods is that a high volume of washing and cooling water is required. Such wash and cooling water must be disposed of and sewage disposal costs are extraordinarily high and in some areas sewage districts refuse to accept such water and the processor must then arrange to have it trucked away.

The undesirably long time taken by prior art methods of washing and cooling the curd, the high sewage disposal costs incurred and the channeling have been tolerated because those skilled in the art believed that there was no practical apparatus or method that would permit the curds to be mechanically agitated to accelerate cooling and make the washing away of whey more efficient without incurring a cost prohibitive degradation of the curds.

SUMMARY OF THE INVENTION

The apparatus and method of the present invention is directed to the concept of moving cottage cheese curds and whey material through a housing in a direction which is counterflow to the direction of fluid flow of a washing and cooling fluid through the housing while simultaneously lifting the curds in the fluid and then lowering th curds in the fluid.

In the preferred embodiment the washer and cooler apparatus includes a longitudinally extending housing having a bottom wall, an interior surface and upstream and downstream ends. Material input and output openings are provided in the housing adjacent the downstream and upstream ends respectively. A fluid inlet and a fluid outlet are also provided in the housing to establish a direction of fluid flow from the upstream end to the downstream end. A material and fluid blender is mounted in the housing for rotation in one direction about an axis of rotation. The blender has at least one, and preferably several lifting and conveying assemblies mounted thereon. Each assembly includes at least one paddle presenting a material supporting surface that extends generally parallel to the internal surface of the housing. The leading edge of the paddle, in the direction of rotation, has a peripheral means for directing the material in the housing onto the supporting surface as the blender rotates during operation. Each assembly also includes at least one, and preferably several material handling sections thereon. Each material handling section has a guiding and conveying wall that presents a surface extending inward from the material supporting surface in angular relation to the axis of rotation of the blender which will, upon rotation of the blender engage, guide and convey the material to move it longitudinally through the housing from the downstream end to the upstream end, counter to the direction of fluid flow.

The lifting and conveying assembly may also include a weir means for temporarlly partially damming fluid flow and resisting material movement in a the downstream direction as said blender rotates. The weir means can comprise a vane means extending from either or both the leading and trailing edges of the paddle.

The method of the present invention comprises the steps of disposing a longitudinally extending housing for containing a fluid in a generally horizontal position to establish an upstream end and a downstream end; constantly admitting a washing and cooling fluid into the housing through a fluid inlet adjacent the upstream end and discharging the fluid through a fluid outlet adjacent the downstream end to establish a reservoir of flowing fluid in the housing that has a normal direction of fluid flow; constantly placing unwashed and uncooled material into the reservoir of flowing fluid adjacent the downstream end; lifting the material in the reservoir of flowing fluid in a direction generally transverse to the normal direction of fluid flow; lowering the material in the reservoir of flowing fluid and simultaneously using gravity forces to move the material, as it is being lowered, at an acute angle relative to the normal direction of fluid flow toward the upstream end; repeating the lifting and lowering steps until the material is moved to the upstream end of the housing; and discharging the material through a material discharge output in said housing adjacent the upstream end.

The method further comprises establishing a temporary weir in the reservoir of flowing fluid to create a momentary region of quiet flow containing eddy currents and material suspended therein upstream of said weir; maintaining the weir while lowering the material in the region of eddy currents; withdrawing the weir to allow reestablishment of the normal direction of fluid flow; and after normal direction of fluid flow is established, repeating the lifting and lowering steps. The weir may be established before lifting material in the flowing reservoir.

The method may further comprise admitting the fluid into a sump which surrounds the material output in the housing adjacent the upstream end; transferring a first portion of the fluid from the sump through the material discharge output into the housing in counterflow relation relative to the direction of material movement through the material discharge output into the sump, with the first portion of fluid constituting the reservoir of flowing fluid; and transferring a second portion of the fluid from the sump with the material entrained therein, through an outlet in the sump.

In an alternative method the washing and cooling fluid is divided immediately after it has been admitted into the housing into the first and second portions; the first portion is directed through the housing to constitute the reservoir of flowing fluid which is discharged through the fluid outlet; and the second portion of the fluid is directed through the material discharge output in parallel flow with the material entrained therein.

BRIEF DESCRIPTION OF THE DRAWINGS

FIG. is a side view of the washer and cooler apparatus with a rotary blender, which is contained therein, shown in simplified block outline form;

FIG. 2 is a plan view of the washer and cooler apparatus with the rotary blender shown in block outline form;

FIG. 3 is an end view of the washer and cooler taken along line III—III of FIG. 1;

FIG. 4 is an end view taken along line IV—IV of FIG. 1;

FIG. 5 is a plan view of the rotary blender of the washer and cooler shown in FIG. 1 with two stages of the blender shown in detail;

FIG. 6 is an end view of the rotary blender taken along line VI—VI of FIG. 5 with a sectional view of part of the housing of the washer and cooler added;

FIG. 7 is a plan view of one of the lifting and conveying assemblies of the blender shown in FIG. 5;

FIG. 8 is an end view of the assembly shown in FIG. 7;

FIG. 9 is a plan view of one of the paddle components used in the assembly shown in FIG. 7;

FIG. 10 is an end view of the paddle component shown in FIG. 9;

FIG. 11 is an end view, partially in section, of a second embodiment of the washer and cooler.

DESCRIPTION OF THE PREFERRED EMBODIMENT

Figure 12:
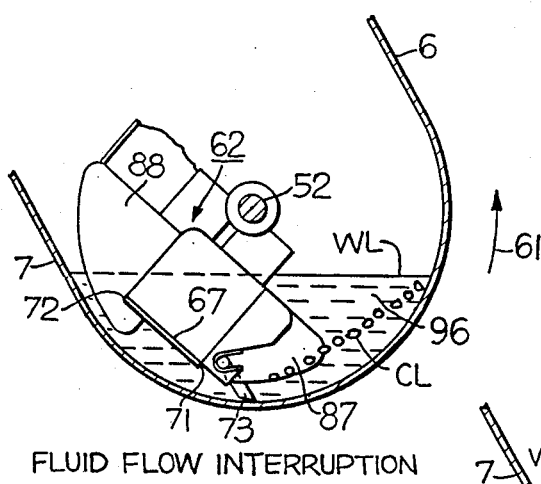
FIGS. 12–15 are simplified cross sectional views of the washer and cooler housing showing only one assembly of the rotary blender in several operational positions.

Referring to FIGS. 1, 2, 3, and 4 the washer and cooler apparatus 1 includes a fluid tight housing 2 for containing friable, easily degradable cottage cheese curds, whey and a washing and cooling fluid such as water. The housing 2 includes a bottom wall 3 which is hemispherical in section, parallel spaced inclined side walls 6 and 7, and end walls 11, 12. The bottom wall 3 and side walls 2, 6 and 7 have an interior surface 8. The inclined housing side walls 6 and 7, as best shown in FIGS. 3 and 4, provide the housing with a generally inclined U-shaped cross section for reasons that will be explained hereafter, but the side walls could be vertical or even diverge or converge if desired. The top of the housing is open and may be closed with a removable cover if desired. The housing 2 has a longitudinal extent and is mounted on a support frame 14 which maintains the longitudinal extent of the housing 2 in a generally horizontal position although it could be inclined slightly from horizontal if desired. The side walls 6 and 7 extend in spaced parallel relation to each other and merge into the semicircular bottom wall 3. The side walls do not need to extend parallel in a longitudinal direction; they could be arranged to provide a housing that tapers from one end to the other.

The housing has a curd and whey material input unit 17 mounted on one side wall 7 which includes a pre-drain means. The material input unit 17 includes a hopper 18 in which any suitable predrain device, such as a bar screen 19, is mounted at an angle to present a surface which slopes downward into the interior of the housing 2. The bar screen includes a plurality of parallel bars which are spaced apart to permit the passage of whey liquid but not the cheese curds. The hopper includes a material inlet conduit 21, which as shown in FIG. 3, is located below the bar screen 19 so that the curd and whey material will flow upward to gently float over a crest member 22 in the hopper and down the inclined bar screen 19. A substantial percentage of the whey, being liquid, will pass through the openings in the bar screen 19 and be carried away through whey discharge outlet 23. The curd and some residual whey will pass into the housing 2 to be processed according to the new method as will be more fully explained hereinafter.

The washer and cooler housing 2 has a barrier wall 26 which extends transversly across the housing between side walls 6 and 7 to divide the housing 2 into a first upstream, material conveying, washing and cooling zone 27, and a second downstream spent, wash and cooling water discharge zone 28. The material input unit 17 discharges into first washing and cooling zone 27 upstream of the barrier wall 26. The barrier wall 26 has a fluid admitting opening 29 (FIG. 3) therethrough to permit spent washing and cooling water to pass from first zone 27 into second zone 28. A filter means 31 is mounted across opening 29 to prevent flow of cheese curds into zone 28. The filter means may be a separate filter screen or grid mounted across opening 29, or may be constituted by a series of openings in the barrier wall itself each of which is smaller in size than the size of the cheese curds.

A fluid inlet 32 is provided in the housing 2 in the first zone 27 adjacent the upstream end 33 and a fluid outlet 36 is provided in the housing 2 in the cooling zone 27 adjacent the downstream end 37. The housing 2 also has a circumferentially arcuate, transversly extending cut-out in the bottom wall providing a material output opening 47 in the second zone 28 adjacent the upstream end 33.

In the embodiment shown in FIG. 4 an integrated sump and fluid inlet housing 38 has first and second side portions 40, 42 which extend transversly from opposite sides 6 and 7 of housing 2. Thus, the sump housing 38 is mounted to enclose the part of the bottom wall 3 of housing 2 that contains output opening 47 and also portions of side walls 6 and 7 adjacent the upstream end 33 so that the sump housing 38 surrounds both the material output opening 47 and the fluid inlet 32 into the housing 2. In the embodiment of FIG. 4 the material output opening 47 has a dual function, serving as both a material output and a fluid inlet for a first portion of the washing and cooling water. The sump housing 38 has a bottom wall spaced from housing wall 3 to form a fluid flow passage directed to cause the fresh water to flow in a direction transverse to the longitudinal extent of housing 2. The sump 38 also has a fluid and material outlet 39. The curd material which exits the housing 2 through output opening 47 will remain in suspension in a second portion of the washing and cooling water and flow over dam 48. The washed and cooled curds and the second portion of water may be transported from the outlet 39 by gravity flow or by suitable pump means to a point of further processing.

In the embodiment shown in FIG. 11, two separate housings, 38A and 43 are provided; one for the sump and one for the water inlet 32. The material output opening 47 is surrounded by the sump housing 38A which has a sump outlet 39A. However, in the embodiment of FIG. 11 the sump housing 38A does not constitute or provide an inlet for fresh washing and cooling water. A separate housing 43 is provided for the water inlet 32. In the embodiment of FIG. 11 the fresh water flowing into the housing will not pass counterflow through the material exiting discharge output 47. The fresh water from inlet 32 is divided into first and second portions, and the second portion will exit material output 47 in parallel flow with the washed and cooled curds.

The washer and cooler includes a material and fluid blender 51, rotatably mounted in the housing 2, which will now be described. The blender includes a shaft means constituted by shaft 52 and a plurality of lifting and conveying assemblies 62 mounted thereon. The shaft 52 has a length longer than the longitudinal extent of housing 2 to present a drive end 56 and an idler end 54 that will extend outside of housing 2 when the shaft 52 is assembled therein. The opposite end walls 11 and 12 of housing 2 are each provided with slot 53 of a width which will receive shaft 52. When assembled the shaft 52 is loosely received in the slots 53 with the idler end rotatably mounted in an idler bearing 57 supported by one end 15 of the frame 14. The slots permit easy removal of the entire blender assembly 51 for cleaning and servicing. The drive end 56 of shaft 52 is mounted in a drive end bearing structure supported by the other end 16 of the frame 14. A drive means 58 of conventional construction is mounted on frame end 16 and includes an electric motor and a gear reducing mechanism so that the R.P.M. of shaft 52 can be regulated.

The drive means 58 is covered by a protective cover, not shown, to minimize risk of contact with any moving parts. The blender shaft 52 has an axis of rotation 60 that extends generally parallel to the longitudinal extent of housing 2 and the drive means 58 provides the shaft 52 with a direction of rotation 61.

The blender 51 has, as shown in FIG. 5, at least one, and preferably a plurality of material lifting and conveying assemblies 62 and 63 which are fixedly mounted on and rotate with shaft 52. A pair of lifting and conveying assemblies 62 and 62A are mounted on shaft 52 to provide the blender with a first material lifting and conveying stage 93, and a pair of lifting and conveying assemblies 63, 63A provide a second stage 94. Each stage overlaps the next succeeding stage and includes, preferably two lifting and conveying assemblies, 62, 62A or 63, 63A that are angularly spaced in relation to each other relative to axis of rotation 60. The basic structure of each lifting and conveying assembly 62, in stage 93, is essentially the same as that of each lifting and conveying assembly 63 in stage 94 and thus only one such assembly will be described.

With reference to FIGS. 5, 6, 7 and 8 each assembly 62 includes a paddle 66 which has a material supporting surface 67. Th paddle 66 is rigidly secured as by welding, on shaft 52 to preferably extend generally parallel thereto and to the interior surface 8 by means of radially extending axially spaced bracket plate 68. The paddle 66 has a leading edge 71 and a trailing edge 72. A material directing means, in the form of a scraper blade 73, is preferably pivotally mounted on the leading edge 71 for movement about an axis that is in spaced parallel relation to the interior surface 8. The blade 73 has a pair of stub shafts 77 at each end thereof which are journaled in suitable bearing supports 78 on paddle 66. If desired intermediate supports 79 may be provided on paddle 66 to pivotally support the mid-portions of blade 73. The scraper blade 73 is beveled at 74 to present a terminal margin. The pivotal mounting of blade 73 permits the edge 71 to follow or be in cooperation with the interior surface 8 of the housing to direct material in the bottom portion of the housing onto the supporting surface 67 as the blender assembly 62 is being rotated during operation.

The lifting and conveying assembly 62 also has at least one, and preferably a plurality of material handling sections 81, best shown in FIG. 7. Each of the sections 81 includes a material guiding and conveying wall 82 presenting a surface 83. Each wall 82 extends radially inward from the surface 67 of relation relative to the axis of rotation. The angular relation is such that when, during rotation, the paddle surface 67 has a position where the paddle surface is in a vertical as illustrated in FIG. 7 each wall 82 will be at an inclined acute angle relative to horizontal. The angular relation of wall 82 is selected so that when material on surface 67 slides downward into contact with wall 82 the material will then continue to slide along and be guided by surface 83 to move longitudinally of the housing toward the upstream end 33 as the blender rotates. As shown in FIG. 7, there are three guiding and conveying walls 82 and a partial wall 82A. The wall 82A is shortened to provide clearance for the mounting of assemblies 63, 63A on shaft 52. Thus there are three box-like, material handling compartments or section 81A, 81B and 81C on the lifting and conveying assembly 62. There could be more or less sections on each assembly as desired. Each of the box-like sections 81 has, relative to the direction of rotation, a three-sided leading margin 84 and a three-sided trailing margin 85. The leading edges 71 of the paddle 67 and of walls 82 define the material admitting opening and the trailing edges of the paddle 67 and of walls 82 define the material discharge opening for each of the sections 81. The material discharge opening 85 is axially off set toward the upstream end 33 relative to the material inlet opening 84.

Each lifting and conveying assembly 62 also includes a weir means generally identified by reference number 86. The weir means 86 comprise a leading edge vane means 87, and trailing edge vane means 88. As shown in FIG. 7, the leading edge vane means comprises a single vane or rudder which has a first planar surface 91 extending forward of the leading edge 71 of the paddle 66 and may, if desired, be a forward extension, in the direction of rotation, of guiding and conveying wall 82. If desired more than one leading edge vane could be used. The trailing edge vane means 88 comprise two rudder like vanes, each of which has a second planar surface 92 extending rearward of the trailing edge, 72 of paddle 66, that is, in a direction away from the direction of rotation. The trailing edge vane 88 may each be a rearward extension of a guiding and conveying wall 82. The trailing edge vane means each have a second planar surface 92 extending rearward of the trailing edge 72 of paddle 66. The first and second surfaces 91, 92 extend radially outward and generally transverse to the axis of rotation 60, but these surfaces could be at somewhat of an angle if desired. Also a greater or lesser number of trailing vanes could be used.

The lifting and conveying assemblies 62 are rigidly mounted on shaft 52 to provide the blender with a plurality of stages 93, 94. There can be as many stages as desired and FIG. 5 shows two such stages, a first stage 93 and a second stage 94. Each stage 93, 94 comprises two material lifting and conveying assemblies 62, 62A and 63, 63A in angularly spaced relation to each other, relative to the axis of rotation 60 as shown in FIG. 6. The assemblies of each stage may be diametrically opposed or angularly offset as desired. The paddle surfaces 67 of assemblies 62 in stage 93 can be orientated at a 90° angle relative to the paddle surfaces 67 of assemblies 63 in stage 94 or at an angle which is more or less than 90°. As shown in FIG. 5, one of the material lifting and conveying assemblies 62A of first stage 93 is offset in an axial upstream direction relative to assembly 62 so that the positions of the box-like sections 81 of assembly 62A will be axially staggered relative to the positions of the box-like sections 81 of assembly 62. The same staggered relationship exists between the sections 81 of assemblies 63 and 63.. The upstream end of assemblies 62 and 62A of stage 93 axially overlap the downstream ends of assemblies, 63, 63A. The offset, staggered, overlapping relationships above described cause the circular path of the discharge opening of each section 81 to be partially overlapped by the circular path of travel of the material admitting opening of section 81 immediately adjacent thereto in an upstream direction. The circular path of travel of the last section 81 which is adjacent the upstream end 33 will pass over the material output opening 47 in bottom wall 3.

The operation of the washer and cooler is best understood with reference to FIGS. 11 and 12–15. For sake of clarity only one material lifting and conveying assembly 62 is shown in FIGS. 12–15, in four different positions. In operation the washing and cooling water is admitted through fluid inlet 32 to fill the housing to the level of water line WL. The water is discharged through outlet 36 and the discharge may be controlled by a valve or by a pump not shown to establish a reservoir of flowing water 96. The blender 51 is rotated slowly; i.e. 1 to 3 RPM. Curds and whey are pumped into the material input 17 (FIG. 3) and as the curds slide down the bar screen 19 most of the liquid whey is separated out into hopper 18 and passes out through drain 23. The curds and residual whey then pass into the reservoir of flowing water 96 at the downstream end of the first zone 27. In actual practice the ratio of water to curds may vary within the range of 1.4 to 6.3 parts water to one part curds. The curds will be retained in the housing within a range of 5 to 15 minutes.

Figure 13:
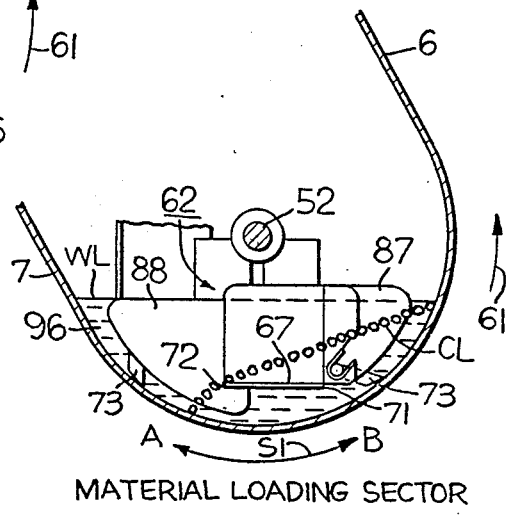

As blender 51 rotates the lifting and conveying assemblies 62, one of which is best shown in FIG. 7, rotates therewith and the sections or compartments 81A, 81B, and 81C follow individual circular paths of travel. As assembly 62 rotates the leading edge vane 87 thereof enters the water and when a the position shown in FIG. 12, will act as a weir to partially dam the water flow. This damming creates a momentary region of quiet water upstream of the vane 87 which will have eddy currents with the curds suspended therein. Thus the normal direction of flow of the curds upstream of vane 87 will be somewhat interrupted. The load of curds will have a curd line CL as shown in FIG. 12. As the assembly 62 continues to rotate the leading edge 71 will travel from point A to point B through a loading sector S1 shown in FIG. 13 with the curd line now being as shown in FIG. 13. The scraper blade 73 and the paddle surface will pass through the water 96, under the material in the Material Loading Sector S1 and the curds and water will enter the compartments 81A, 81B, and 81C, (FIG. 7). In sector S1 the paddle surface 67 will be generally horizontal in a material supporting orientation although it must be understood that the surface 67 follows one circular path and will be precisely horizontal at only one point. Thus the phrase "generally horizontal" means the extent of the arc through which the surface 67 will pick up and support material thereon.

Figure 14:
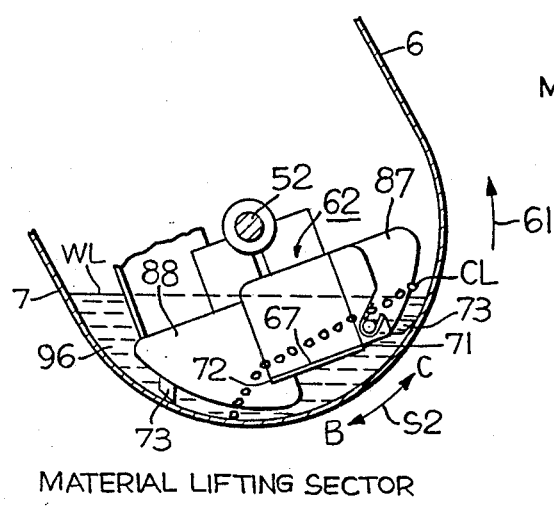

As blender rotation continues the paddle leading edge will pass from point B to point C through a Material Lifting sector S2 shown in FIG. 14. In sector S2 the curds are lifted through the water in a direction transverse to the direction of fluid flow and assume the curd line CL generally shown in FIG. 14.

Figure 15:
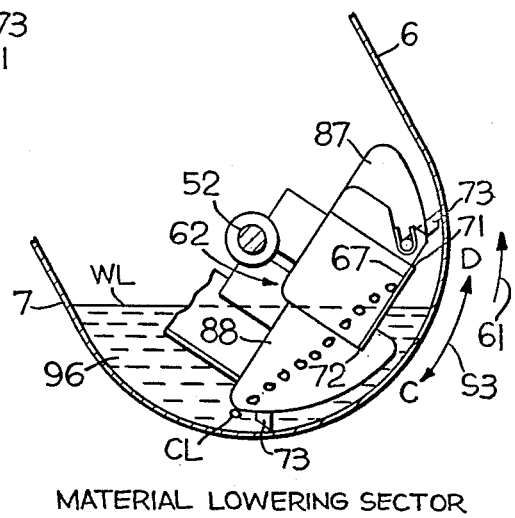

As blender rotation continues the paddle leading edge will pass from point C to point D through a Material Lowering Sector S3 shown in FIG. 15. Because side wall 6 is inclined, the scraper blade 73 will follow the interior surface 8 to a higher point before leaving contact therewith to minimize the risk that curds will tumble over the scraper and fall a long distance downward into the reservoir 96. In sector S3 gravity forces will cause the curds to move or slide down paddle surface 67 into contact with guiding and conveying wall surface 83 of compartment 81A which in turn will cause the curds to assume the curd line CL shown in FIG. 14 and the curds and water will softly slide downward at an acute angle, relative to the normal direction of fluid flow, toward the upstream end of the housing 2 and over the traling edge 72 of paddle 66. The upward movement of wall surface 83 will also push curds in an upstream direction.

These steps are repeated and each time the material is lifted and lowered some of it is moved upstream into the path of travel of the lifting and conveying assembly compartment 81 which is next adjacent thereto in an upstream direction until it reaches the material output 47 FIGS. 4 or 11. The curds, being heavier than water, will settle downward into sump 38 or 38A. In the embodiment of FIG. 4 the curds will exit in counterflow through the water entering housing 2 through output 47. In the embodiment of FIG. 11, the curds will pass in parallel flow with a second portion of the water that has already entered housing 2 with this flow of water assisting the passage of curds through output 47.

As the blender is constantly rotating it will be understood that points AB, BC, and CD which define section S1, S2 and S3 respectively, do not denote exact points at which a precise change in function takes place. The function in each sector changes gradually and, for example, some lowering of material will start to occur during the lifting stage.

Similarly the curd lines CL shown in FIGS. 12-15 are by way of example and not as a limitation as the curd lines CL will vary somewhat depending up the R.P.M. of the blender and the ratio of water to curds. A significant advantage of the present apparatus is that it will result in a totally uniform cooling and washing of the final yield of cheese curds, whereas channeling and bridging which can occur in prior art coolers may result in some inadequately cooled and washed cheese curds in the final yield. Residual whey continues to leach out of the curds during washing. By reason of softly lifting and lowering the curds in the flowing reservoir of water the amount of residual whey that will be retained by the curds is reduced to a minimum and the risk of tainting the taste of the finished cottage cheese is greatly reduced.

The method of the present invention comprises disposing a fluid tight housing, such as housing 2, in a generally horizontal position and establishing upstream and downstream ends 33, 37. A washing and cooling fluid such as water is constantly admitted into the upstream and discharged at the downstream end to establish a reservoir 96 of flowing water through the housing 2 that has a normal direction of flow D, FIG. 1. The curd and residual whey material, in an unwashed and uncooled condition, is constantly placed into the reservoir of flowing water adjacent the downstream end. The curds, with some residual whey thereon, are gently lifted in a reservoir of flowing water in a direction that is generally transverse to the normal direction of water flow. The curds are then lowered in the reservoir of flowing water using gravity and pushing forces to move said material, as it is being lowered in the flowing reservoir, along a path of travel toward the upstream end, that has an acute angle relative to the normal direction of water flow. The lifting and lowering steps are repeated until the material has been moved to and discharged through the material discharge output 47.

More specifically, the step of lifting is accomplished by rotating a material supporting surface 67 to a position under the material in the housing and then continuing rotation of the surface 67 to raise it and material thereon in the flowing reservoir of water and utilizing the force of gravity to transfer the material to a surface 83 which is downwardly inclined toward the upstream end of the housing. Gravity and pushing forces will cause the material to gently slide downwardly along the inclined surface 83 in the flowing reservoir with the water lubricating the curds to minimize degrading during sliding. The washing and cooling action can be enhanced, and degrading of the curd into fines further reduced, if the method includes the additional steps of establishing a temporary weir in the flowing reservoir to create a momentary region of quiet water therein containing eddy currents. The weir is maintained while the material on the paddle 66 is lowered in the quiet region of eddy currents after which the weir is withdrawn to allow reestablishment of the normal direction of water flow. The weir will, in addition to creating regions of quiet water, serve as an anti-material back flow means which will impede the normal tendency of the curds to be carried downstream by the water current in the normal direction of fluid flow.

Preferably the weir will be established before the paddle is moved under the curd material and then maintained until the material is lowered in the flowing water reservoir. Because the washing and heat transfer function is promoted by maintaining some degree of water flow past the curds at all time, it is preferable that the weir not stop all water flow but allow some water to pass at all times. What the temporary dam accomplishes is to momentarily slow the downstream movement of the curds so that they may be picked up while in a relatively quiet state of suspension to minimize degrading. Therefore the weir is maintained until the curds are again lowered in the water so that they will be redeposited in a region of relatively quiet water to minimize degrading.

As the paddle is being raised the water which has been picked up with the curds will partially drain off and cascade back into the quiet region of the reservoir of water. However, because the weir does not stop all water flow, the residual water flow will carry the heated, whey containing water downstream so that when the curds are lowered, the water into which they are lowered will be cooler and more free of whey than the water they were raised from in order to provide the most efficient cooling and washing.

The continuous lifting and upstream directed lowering will move the curds to the upstream end 33 of the housing in a series of stepped movements. When the curds reach the upstream end their last lowering occurs above a material discharge output 47 in the housing 2. In one embodiment the method may combine dividing the fresh water into first and second portions before the water is admitted into the upstream end 33 of housing 2. The first portion of water is then admitted into the housing 2 through the same opening 47 through which material is discharged counterflow thereto and constitutes the flowing reservoir. The second portion of fresh water is not admitted into housing 2 but is used to keep the discharged, washed and cooled curds in fluid suspension for transfer to a point of further processing such as draining and creaming.

In another embodiment of the invention the fresh washing and cooling water is divided into first and second portions immediately after it has been admitted into the upstream end 33 of housing 2. The first portion of water is then directed to form the flowing reservoir of water and is directed through the housing for discharge through water outlet 36. The second portion of water is directed through the material discharge output 47 in parallel flow with the curd material flowing therethrough and serves to maintain the washed and cooled curds in fluid suspension for transfer to a point of further processing as described hereinbefore.

The apparatus disclosed in FIGS. 1-11 is well suited to carrying out the above described method. However, it is possible to practice the disclosed method using other types of apparatus for lifting the material in the reservoir of flowing water and lowering it in the reservoir of flowing water. In addition various types of weir means can be invisioned by those skilled in the art to momentarily dam the flow of water in a housing.

I claim:

1. A counterflow washer and cooler for processing a degradable curd and whey material comprising:
   a housing for containing said curd and whey material having
   a horizontal longitudinally extending bottom wall, an interior surface, an upstream end and a downstream end,
   material input and output openings in said housing adjacent said downstream and upstream ends respectively,
   a fluid inlet in said housing adjacent said upstream end, and
   a fluid outlet in said housing adjacent said downstream end for establishing a direction of fluid flow through said housing during operation from said upstream end to said downstream end;
   a material and flow blender including
   a shaft means rotatally mounted in said housing and having an axis of rotation extending parallel to said longitudinal extent of said housing, and a direction of rotation,
   at least one material lifting and conveying assembly mounted on said shaft means, each said assembly including,
   at least one paddle having a material supporting surface extending parallel to said interior surface and having, relative to said direction of rotation, a leading edge and a trailing edge,
   a material directing means on said leading edge in cooperation with said interior surface for directing said material in said housing onto said supporting surface in said housing as said blender is being rotated during operation, and
   at least one material handling section including a material guiding and conveying wall having a surface extending inward from said material supporting surface in angular relation to said axis of rotation for moving said material longitudinally in said housing from said downstream end to said upstream end counter to said direction of fluid flow when said blender is rotated during operation; and
   a drive means for rotating said material and fluid blender shaft.

2. A counterflow washer and cooler according to claim 1 wherein said lifting and conveying assembly has a weir means mounted on said paddle for resisting material and fluid movement in said direction of fluid flow, said weir extending radially relative to said axis of rotation and having a surface extending transversely to said direction of fluid flow which terminates adjacent said interior surface.

3. A counterflow washer and cooler according to claim 2 wherein said weir means includes a leading edge vane means having first planar surface extending from said leading edge of said paddle in direction of rotation and transversely to said axis, and a trailing edge vane means having a second planar surface extending from said trailing edge of said paddle away from said direction of rotation and transversly to said axis.

4. A counterflow washer and cooler according to claim 1 wherein said material and fluid blender comprises a first stage which includes a plurality of said assemblies, each of said assemblies angularly spaced in relation to each other relative to said axis of rotation.

5. A counterflow washer and cooler according to claim 4 wherein said first stage includes two of said assemblies which are in diametrically opposed relation to each other relative to said axis of rotation.

6. A counterflow washer and cooler according to claim 1 wherein each said assembly includes a plurality of material handling sections, said lifting and conveying surface of each of said sections being axially spaced from an adjacent lifting and conveying surface to define, in cooperation with said material supporting surface on said paddle, a plurality of axially spaced compartments.

7. A counterflow washer and cooler according to claim 6 wherein anti-back flow weir means for resisting material movement in said direction of fluid flow extends from one or more of said material handling sections.

8. A counterflow washer and cooler according to claim 7 wherein each of said anti-back flow weir means extends from said trailing edge of said paddle supporting surface as an extension of one or more of said lifting and conveying surfaces.

9. A counterflow washer and cooler according to claim 1 wherein said blender includes a plurality of stages, each of said stages comprising two of said assemblies angularly spaced, in relation to each other, relative to said axis of rotation, and wherein said two assemblies of each stage are angularly spaced in relation to said axis of rotation relative to said two assemblies of an adjacent stage.

10. A counterflow washer and cooler according to claim 6 wherein each of said compartments has a material admitting opening adjacent said leading edge of said paddle and a material discharge opening adjacent said trailing edge of said paddle, said material discharge opening being axially offset toward said upstream end relative to said material inlet opening.

11. A counterflow washer and cooler according to claim 10 wherein said lifting and conveying surface of each of said sections has, relative to said direction of rotation, a leading margin and a trailing margin, said leading margin and said paddle leading edges defining said material admitting opening of each of said sections and said trailing margins and said paddle trailing edges defining said material discharge opening of each of said sections.

12. A counterflow washer and cooler according to claim 11 wherein said weir means extends from both said leading and trailing margins of said lifting and conveying walls.

13. A counterflow washer and cooler according to claim 1 wherein said material directing means comprises a scrapper blade mounted on said paddle leading edge for pivotal movement relative thereto about an axis that is in spaced parallel relation to said interior surface.

14. A counterflow washer and cooler according to claim 1 wherein said fluid inlet and said material output comprise a single opening adjacent said upstream and of said housing.

15. A counterflow washer and cooler according to claim 1 wherein said housing has a transversely extending cutout in said bottom wall adjacent said upstream end, wherein a sump housing is mounted at said upstream end of said housing in fluid-tight surrounding relation to said cutout, said sump having a sump portion below said cutout and first and second side portions extending transversely from said housing, and wherein said fluid inlet is in one of said manifold side portions and said material output is located in the other of said manifold side portions.

16. A counterflow washer and cooler according to claim 15 wherein a portion of said blender paddle is positioned to pass over said cutout as said blender is rotated during operation.

17. A counterflow washer and cooler according to claim 1 wherein said material input includes a predrain means through which said material passes for separating whey from curds prior to said curds entering said housing.

18. A counterflow washer and cooler according to claim 1 wherein said longitudinally extending housing has a transversely extending barrier dividing said housing into a first upstream material conveying and washing zone, and a second downstream spent fluid discharge zone, said material and fluid blender being mounted in said first zone, said barrier wall having a fluid admitting opening therethrough to permit said spent washing and cooling fluid to pass therethrough, and a filter means mounted across said opening to prevent curd material from passing into said second zone.

* * * * *